United States Patent
Yang et al.

(10) Patent No.: US 6,887,597 B1
(45) Date of Patent: May 3, 2005

(54) METHODS AND COMPOSITION FOR CLEANING AND PASSIVATING FUEL CELL SYSTEMS

(75) Inventors: Bo Yang, Ridgefield, CT (US); Peter M. Woyciesjes, Woodbury, CT (US); Filipe J. Marinho, Danbury, CT (US)

(73) Assignee: Prestone Products Corporation, Danbury, CT (US)

( * ) Notice: Subject to any disclaimer, the term of this patent is extended or adjusted under 35 U.S.C. 154(b) by 0 days.

(21) Appl. No.: 10/838,046

(22) Filed: May 3, 2004

(51) Int. Cl.[7] .............................................. H01H 8/00
(52) U.S. Cl. ........................... 429/12; 429/26; 510/184; 134/22.1; 134/22.16; 134/22.17; 134/22.19; 134/26; 134/34; 134/36; 134/42
(58) Field of Search .................... 429/12, 26; 510/184; 134/22.1, 22.16, 22.17, 22.19, 34, 26, 36, 42

(56) References Cited

U.S. PATENT DOCUMENTS

| | | | |
|---|---|---|---|
| 2,824,069 A | * 2/1958 | Hall ............................ 510/184 |
| 3,085,916 A | * 4/1963 | Zimmie et al. ........... 134/22.19 |
| 3,948,792 A | 4/1976 | Watsen et al. .............. 252/181 |
| 3,959,166 A | 5/1976 | Oberhofer et al. .......... 252/146 |
| 3,962,109 A | 6/1976 | Oberhofer et al. .......... 252/146 |
| 4,363,741 A | 12/1982 | Gould ........................ 252/142 |
| 4,540,443 A | 9/1985 | Barber ........................... 134/2 |
| 4,762,638 A | 8/1988 | Dollman et al. ............. 252/135 |
| 4,789,406 A | * 12/1988 | Holder et al. .................. 134/3 |
| 5,050,549 A | 9/1991 | Sturmon ..................... 123/198 |
| 5,062,987 A | 11/1991 | Turcotte et al. ............. 252/156 |
| 5,071,582 A | 12/1991 | Conville et al. .............. 252/81 |
| 5,342,537 A | 8/1994 | Conville et al. ............. 252/174 |
| 5,468,303 A | 11/1995 | Thomas, Sr. ................... 134/3 |
| 5,468,412 A | 11/1995 | Rodzewich ................. 252/106 |
| 5,925,173 A | * 7/1999 | Frost et al. .............. 106/14.14 |
| 6,156,129 A | * 12/2000 | Hlivka et al. ................. 134/42 |
| 6,548,468 B1 | * 4/2003 | Boulos et al. .............. 510/362 |
| 6,576,361 B1 | 6/2003 | Barton ........................ 429/25 |
| 6,673,482 B2 | 1/2004 | Imazeki et al. ............... 429/26 |
| 2001/0049033 A1 | * 12/2001 | Oko et al. ..................... 429/13 |
| 2004/0013916 A1 | 1/2004 | Rao et al. ..................... 429/18 |

* cited by examiner

*Primary Examiner*—Sharidan Carrillo

(57) ABSTRACT

A cleaner-passivator composition and method for treating a fuel cell cooling system are described. The cleaner-passivator comprises a complexing agent, a surfactant, a corrosion inhibitor, and a solvent. The cleaner-passivator reduces the contaminants circulating in the fuel cell coolant system that contribute to increasing conductivity in the fuel cell coolant. In addition, the passivator reduces the surface corrosion in the fuel cell system.

24 Claims, 1 Drawing Sheet

US 6,887,597 B1

METHODS AND COMPOSITION FOR CLEANING AND PASSIVATING FUEL CELL SYSTEMS

BACKGROUND

Fuel cells are a clean and efficient electric power source proposed for use in a variety of applications, including replacing or supplementing the internal combustion engines currently employed in automobiles. A fuel cell assembly comprises an anode (i.e., a negatively charged electrode where the oxidation reaction takes place), a cathode (i.e., a positively charged electrode where the reduction reaction takes place), and an electrolyte in between the two electrodes. In order to produce sufficient electric power for use as a vehicle engine, fuel cell engines typically employ a fuel cell stack comprising multiple fuel cell assemblies (e.g., about 100 or more fuel cells) connected in series. While a single fuel cell may operate at a DC voltage of about 0.6 volts to about 1.0 volts, an automotive fuel cell stack may operate at a DC voltage of 125 volts to 450 volts.

In fuel cell systems, the components of the individual fuel cell, for example, to anode, cathode, and/or bipolar plates, contain coolant channels. The coolant channels circulate a coolant about each fuel cell assembly within the fuel cell stack. In circulating a coolant through the coolant channels, the temperature of the fuel cell stack may be controlled by regulating the coolant flow and temperature.

The cooling system surrounding the fuel cell stack, however, is exposed to the same voltage as the fuel cell stack itself. To reduce the electrical shock possibility within the fuel cell stack, the coolant should have a low conductivity such as, for example, less than about 5 microseamens/cm ($\mu$S/cm). During normal operation of a fuel cell system, corrosion, leaching, and decomposition of coolant system parts may lead to the production of ionic species which can increase the conductivity of the coolant. To prevent the coolant from exceeding the conductivity limits, a mixed bed ion exchange resin filter may be employed to remove the ionic species which are produced. Because of the low conductivity requirements and the expected use of mixed bed ion exchange resins, the use of corrosion inhibitors may not be feasible with these systems. This is at least in part because many corrosion inhibitors comprise ionic species. At the concentration of the inhibitors employed to provide effective corrosion protection, the coolants containing the inhibitors may have a conductivity that is higher than the acceptable limits of less than about 5 $\mu$S/cm. In addition, these ionic corrosion inhibitors may be removed by mixed bed ion exchange resins.

There thus remains a need for compositions and methods to maintain coolant conductivity at desirable levels during the operation and lifetime of a fuel cell system, and/or prevent corrosion of the fuel cell system during use.

BRIEF SUMMARY

In one aspect, a cleaner-passivator composition for treatment of a fuel cell coolant system comprises a complexing agent; a surfactant; a corrosion inhibitor; and a solvent; wherein the cleaner-passivator composition comprises no added non-biodegradable aminocarboxylates.

In another aspect, a cleaner-passivator composition for treatment of a fuel cell coolant system comprises a complexing agent; a surfactant; a silicate, an organosilane-based compound comprising one or more silicon-carbon bonds, a tetraalkylorthosilicate ester, or a combination thereof; an azole; a pyrophosphate; and a solvent.

A method of treating a fuel cell coolant system comprises contacting the fuel cell coolant system with a cleaner-passivator composition, and rinsing the fuel cell coolant system with a rinse solvent.

Figure 1:
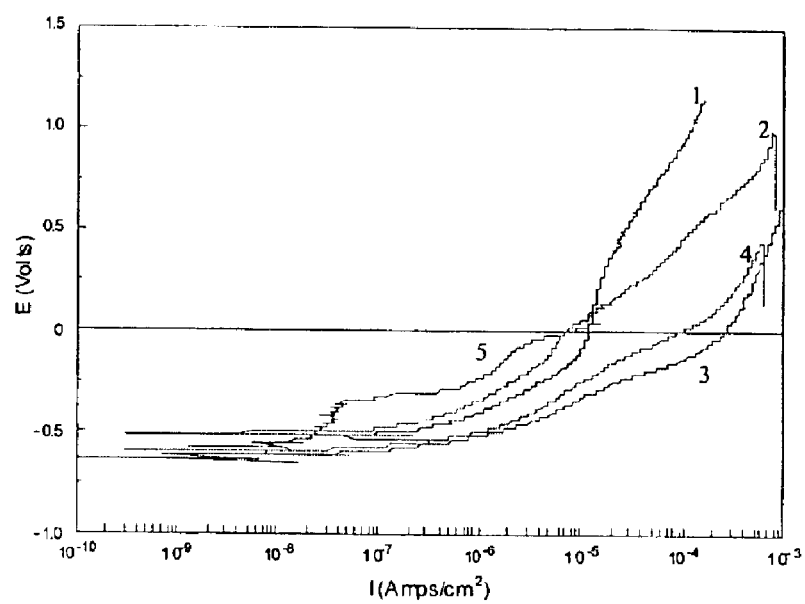
FIG. 1 shows a Current (I) vs. Potential polarization curve showing the effect of different cleaner-passivator treatments on the corrosion protection of Al 3003, a type of aluminum.

The above-described and other features will be appreciated and understood by those skilled in the art from the following detailed description, drawings, and appended claims.

DETAILED DESCRIPTION

During studies of coolant conductivity, it was discovered that new parts coming in contact with the fuel cell coolant system may be cleaned prior to the contact with coolant so as to reduce undesirable increases in the coolant conductivity. In addition, during normal operation of a fuel cell system, corrosion, leaching and decomposition of coolant system parts may lead to the production of ionic species which can increase coolant conductivity. Thus, periodic cleaning of the fuel cell system may be desirable. In order to reduce system corrosion and increase system service lifetime, it is also desirable to passivate the fuel cell coolant system prior to adding new coolant and/or after installing new parts in the coolant system. Passivation creates a protective film on the surfaces of the components of the fuel cell coolant system which protects the components against corrosion.

The inventors herein have discovered that a combination cleaner-passivator composition may be employed to both clean and passivate the metallic and non-metallic surfaces in a fuel cell coolant system. The cleaner cleans the interior of the fuel cell coolant system, removing oil, sludge, corrosion products, and other undesirable contaminants and/or deposits on the surface of the fuel cell coolant system. The cleaner may disperse and/or dissolve these species into the cleaner solution. The passivator promotes the formation of a durable protective film on the metal surfaces of the fuel cell coolant system. This protective film may reduce the corrosion tendency of the metal surfaces during the subsequent normal operation of the system. After treatment with a combination cleaner-passivator composition, the system may be drained and rinsed with rinse solvent, i.e., with deionized water. When the conductivity of the rinse solution is reduced to a specified low level, the system is drained. The coolant for the normal operation of the system is then added.

The combination cleaner-passivator composition for fuel cell coolant systems may be in the form of a single treatment package or in the form of two packages, with one containing a cleaner composition and the other containing a passivator composition. To simplify the application procedure, a single treatment package may be employed. To achieve better passivation and form a more durable protective film after the treatment, a two-package treatment may be employed. The cleaning and/or the passivation process may be done at a temperature of 10° C. to 100° C. To increase the deposit removal rate, quicken the passivation process, and promote the formation of a better protective layer, either or both the cleaning and passivation processes may be carried out at a temperature elevated above the ambient temperature, e.g., at about 30° C. to about 100° C.

A cleaner-passivator composition comprises a complexing agent, a surfactant, a corrosion inhibitor, a solvent, an optional antifoam agent, an optional pH adjusting agent, an optional biocide, and an optional colorant and/or dye. A cleaner composition comprises a complexing agent, a surfactant, a corrosion inhibitor, a solvent, an optional antifoam agent, an optional pH adjusting agent, an optional biocide, and an optional colorant and/or dye. A passivator composition comprises a corrosion inhibitor, a solvent, an optional antifoam agent, an optional pH adjusting agent, an optional biocide, and an optional colorant and/or dye. Individual cleaner and/or passivator components may have more than one function. For example, certain pH adjusting agents may also act as corrosion inhibitors (e.g., borax and nitric acid) and certain corrosion inhibitors may also act as complexing agents (e.g., potassium pyrophosphate).

As used herein, the term complexing agents includes chelating agents. The complexing agent may comprise hydroxycarboxylates (e.g., citric acid, tartaric acid, gluconic acid, glucaric acid, glucoheptonic acid, glycolic acid, and their isomers and salts); phosphonates and phosphinates [e.g., HEDP (1-1-hydroxyethylidene-1, 1-diphosphonic acid), PBTC (2-phosphono-butane-1,2,4-tricarboxylic acid), AMP (amino tri(methylene phosphonic acid)), HPA (hydroxyphphono acetic acid), HMDTMP (hexamethylenediaminetetra (methylene phosphonic acid)), DTPA Diethylenetriaminepenta (methylene phosphonic acid), Bricorr 288 (phosphono succinic acid, and its mono, bis and polymeric adducts), PSO (phosphino succinic acid, and its mono, bis and oligomeric adducts), and their isomers and salts]; non-biodegradable aminocarboxylates [e.g., EDTA (ethylenediaminetetraacetic acid), and NTA (nitrilotriacetic acid)]; biodegradable aminocarboxylates [e.g., EDDS {(S,S)-ethylenediaminedisuccinic acid}, IDSA (iminodisuccinic acid), MGDA (methylene diacetic acid), ethylenediamine-N,N'-diglutaric acid, 2-hydroxypropylenediamine-N,N'-disuccinic acid, and hydroxyethylenediaminetriacetic acid, and their isomers and salts]; carboxylates and dicarboxylates (e.g., oxalic acid, benzoic acid, formic acid, acetic acid, sulfamic acid, adipic acid, succinic acid, and peracetic acid); acrylate based polymers, copolymers and terpolymers, [e.g., polyacrylates, acrylate-acrylamide copolymers, acrylate-AMPS (acrylamido methylene sulphonic acid) copolymers, acrylate-maleate copolymers, acrylate-hydroxypropolyacrylate copolymers, acrylate-sulfonic acid copolymers, acrylate-acrylamide-sulfonic acid terpolymers, sulfoalkylated acrylamide acrylate terpolymers, amine substituted sulfomethylated acrylamide acrylate terpolymers, polymethacrylic acid, acrylate-methacrylate copolymers, phosphinate-acrylate copolymers, acrylate-AMPS-styrene sulphonate terpolymers, acrylate-AMPS-phosphinate terpolymers]; maleic acid based polymers (e.g., polymaleic acid, polymaleic anhydride, styrene sulphonate-maleic acid copolymers, sulfonated styrene maleic anhydride); polyaspartic acid and aspartic acid based copolymers; and the like; and combinations comprising one or more of the foregoing complexing agents. In one embodiment, the complexing agent is citric acid. In another embodiment, the cleaner and/or passivator may be free of non-biodegradable aminocarboxylates such as EDTA and NTA. In yet another embodiment, the cleaner and/or passivator may be free of biodegradable aminocarboxylates as well as non-biodegradable aminocarboxylates, i.e., free of added aminocarboxylates.

The surfactant is employed to remove oil and grease. The surfactant may comprise a nonionic surfactant [e.g., (a) EO-PO (ethylene oxide-propylene oxide) block copolymers, such as Pluronic L61, L62, L63, L64, L65, L81, and L101 from BASF Corp., and other EP-PO, EO-PO-EO, PO-EO-PO block copolymers with trade names of Tetronic and Tetronic R, Pluronic L and R, Alkatronic; (b) Nonylphenoxy ethoxylates (NPE), such as Igepal CO (CDN), Tergitol NP series, Makron series, Alkasurf NP, Sulfonic N series, etc; (c) Octylphenol ethoxylate (OPE), such as Triton X series, Surfonic NP, Sulfonic OP series, Igepal CA (CDN); and (d) Primary and secondary Ethoxylated alcohols, such as Alfonic, DeSonic and Tergitol 15-S series, Neodol brand, and (e) polyethylene fatty acids such as tall oil, and (f) polypropylene oxide or polypropylene glycol (PPG) and polyethylene oxide or polyethylene glycol, and the like]; an anionic surfactant, such as, for example, sodium dioctyl sulfosuccinate, sodium dodecylbenzenesulphonate, sulphonated diphenyl oxide, and the like; a cationic surfactant, such as, for example, ethoxylated ether amines; an amphoteric surfactant, such as, for example, either amine and imidazoline derivatives of fatty acids, and the like; hydrotrope surfactants, such as sodium alkyl naphthalene sulphonates, phosphate aromatic or aliphatic esters, and sodium xylene sulphonate; alcohol surfactants (e.g., Neodol brand alcohol surfactants available from Shell Chemicals); and combinations comprising one or more of the foregoing surfactants. In certain embodiments, the surfactants include EO-PO block copolymers and/or an alkoxylated alcohol such as an ethoxylated linear alcohol available as Tomadol 25-12 from Tomah.

A corrosion inhibitor is employed to reduce corrosion in the fuel cell coolant system. The corrosion inhibitor may comprise an aluminum corrosion inhibitor (e.g., a silicate; a tetraalkylorthosilicate ester with the alkyl groups containing 1 to 20 carbon atoms (e.g., tetramethylorthosilicate, tetraethylorthosilicate, and the like); and/or an organosilane-based compound comprising a silicon-carbon bond [i.e., compounds that are capable of hydrolyzing in the presence of water to form silanols (i.e., compounds with an Si—OH group)], such as sodium(trihydroxysilyl)-propylmethylphosphonate or Q1-6083 from Dow Corning, and alkoxysilanes, e.g., Silquest® Y-5560 silane (i.e., polyalkyleneoxidealkoxysilane), Silquest® A-186 [2-(3,4-epoxycyclohexyl)ethyltrimethoxysilane], Silquest® A-187 (3-glycidoxypropyltrimethoxysilane), 3-aminopropyltriethoxysilane, N-2-(aminoethyl)-3-aminopropyltrimethoxysilane, octyltriethoxysilane, vinyltriethoxysilane, vinyltrimethoxysilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, chloropropyltriethoxysilane, chloropropyltrimethoxysilane, 3-(trimethoxysilyl) propyldimethyloctadecyl ammonium chloride, bistriethoxysilylpropyltetrasulphide, bistriethoxysilylpropyldisulphide, or other Silquest® type silanes available from OSi Specialties or GE Silicones, and silane based coupling agents available from Dow Corning and other suppliers; carboxylates such as benzoates; $C_5$–$C_{16}$ dicarboxylates; $C_5$–$C_{16}$ monocarboxylic acids; neoacids; alkyl($C_1$–$C_{14}$) cyclohexenoic acid and its salts; nitrate salts; nitrite salts; phosphate salts; and combinations comprising one or more of the foregoing aluminum corrosion inhibitors; a yellow metal corrosion inhibitor (e.g., hydrocarbyl triazoles, such as benzotriazole and tolyltriazole, thiazoles such as mercaptobenzothiazole, imidazoles such benzimidazole, and other azoles); a ferrous metal corrosion inhibitor (e.g., orthophosphates, pyrophosphates, hexametaphosphates, polyphosphates, phosphonates, phosphinates, molybdates, vanadates, tungstates, borates, silicates, a zinc compound, carboxylates, and the like); and combinations comprising one or more of the foregoing corrosion inhibitors. In one embodiment, the corrosion inhibitor comprises an aluminum corrosion inhibitor, a yellow metal corrosion inhibitor, and a ferrous metal corrosion inhibitor. In another embodiment, the corrosion inhibitor comprises a silicate, a tetraalkylorthosilicate ester, an organosilane-based compound comprising a silicon-carbon bond, or a combination comprising one or more of the foregoing compounds; an azole; and a pyrophosphate.

The optional antifoam agent may comprise a silicone, for example, SAG 10 or similar products available from OSI Specialties, Dow Corning or other suppliers; an ethylene oxide-propylene oxide (EO-PO) block copolymer and a propylene oxide-ethylene oxide-propylene oxide (PO-EP-PO) block copolymer (e.g., Pluronic L61, Pluronic L81, or other Pluronic and Pluronic C products); poly(ethylene oxide) or poly(propylene oxide), e.g., PPG 2000 (i.e., polypropylene oxide with an average molecular weight of 2000); a hydrophobic amorphous silica; a polydiorganosiloxane based product (e.g., products containing polydimethylsiloxane (PDMS), and the like); a fatty acids or fatty acid ester (e.g., stearic acid, and the like); a fatty alcohol, an alkoxylated alcohol and a polyglycol; a polyether polyol acetate, a polyether ethoxylated sorbital hexaoleate, and a poly(ethylene oxide-propylene oxide)monoallyl ether acetate; a wax, a naphtha, kerosene and an aromatic oil; and combinations comprising one or more of the foregoing antifoam agents. Certain surfactants may act as combination surfactants and antifoam agents.

As used herein, the optional pH adjusting agent includes agents to buffer and adjust the pH of the cleaning solution. The pH adjusting agent may comprise a borate, a phosphate, a carbonate, a base (e.g., NaOH, KOH), an acid, (e.g., $H_2SO_4$, $H_3PO_4$, and $HNO_3$); and the like; and combinations comprising one or more of the foregoing pH adjusting agents.

The optional biocide may comprise one or more non-oxidizing biocides, such as glutaraldehyde, isothiazolones (e.g., 5-chloro-2-methyl-4-isothiazolin-5-one and 2-methyl-4-isothioazolin-3-one), 2-bromo-2-nitropropane-1, 3-diol, 2,2-dibromo-3-nitrilopropionamide, dodecylguanidine hydrochloride, dithiocarbamates, methylene bisthiocyanate, quaternary amines, 2-(thiocyanomethylthio)benzothiazole, tetrakishydroxy methyl phosphonium sulfate, 2-nitro-2-hydroxymethyl-1, 3-propanediol, and combinations comprising one or more of the foregoing biocides. The biocide is employed in an amount sufficient to produce the desired level of biocidal activity.

The optional colorants and/or dyes include, for example, "Alizarine Green", "Uranine Yellow" or "Green AGS-liquid" from Abbey Color Inc., "Orange II (Acid Orange 7)" or "Intracid Rhodamine WT (Acid Red 388)" from Crompton & Knowles Corp., and the like, and combinations comprising one or more of the foregoing colorants and dyes. The colorants and/or dyes are used in an amount sufficient to provide the desired color.

Suitable solvents for the cleaner and/or passivator composition include, for example, water; a glycol; such as ethylene glycol, 1,2-propylene glycol, diethylene glycol, triethylene glycol, dipropylene glycol, and 1,3-propanediol, butylene glycol; an alcohol, such as methanol, ethanol, propanol, isopropanol, butanol, and furfurol and glycerol, monoethylether of glycerol, dimethyl ether of glycerol, 1,2,6-hexanetriol, trimethylolpropane, methoxyethanol, and combinations comprising one or more of the foregoing solvents.

A one part cleaner-passivator system comprises, based on to total weight of the cleaner-passivator system, about 0.1 wt % to about 50 wt % of the complexing agent, preferably about 0.2 wt % to about 30 wt %, and more preferably about 0.4 wt % to about 20 wt %; about 0.003 wt % to about 10 wt % of the surfactant, preferably about 0.006 wt % to about 5 wt %, and more preferably about 0.008 wt % to about 2.5 wt %; about 0 wt % to about 1 wt % of the antifoam agent, preferably about 0.002 wt % to about 0.5 wt %, and more preferably about 0.003 wt % to about 0.2 wt %; about 0.001 wt % to about 10 wt % of the corrosion inhibitor, preferably about 0.003 wt % to about 5 wt %, and more preferably about 0.005 wt % to about 3 wt %; a sufficient amount of the buffering and pH adjusting agent to adjust the pH to about pH 4 to about pH 13, preferably to about pH 5 to about pH 12.5, and more preferably about pH 6 to about pH 12; and about 20 wt % to about 99.7 wt % of the solvent, preferably about 40 wt % to about 99.5 wt %, and more preferably about 60 wt % to about 99.4 wt %.

A cleaner preferably comprises, based on the total weight of the cleaner, about 0.2 wt % to about 50 wt % of the complexing agent, preferably about 0.3 wt % to about 40 wt %, and more preferably about 0.4 wt % to about 30 wt %; about 0.003 wt % to about 10 wt % of the surfactant, preferably about 0.006 wt % to about 5 wt %, and more preferably about 0.008 wt % to about 2.5 wt %; about 0 wt % to about 1 wt % of the antifoam agent, preferably about 0.002 wt % to about 0.5 wt %, and more preferably about 0.002 wt % to about 0.2 wt %; about 0.001 wt % to about 10 wt % of the corrosion inhibitor, preferably about 0.003 wt % to about 5 wt %, and more preferably about 0.005 wt % to about 3 wt %; a sufficient amount of the buffering and pH adjusting agent to adjust the pH to about pH 1 to about pH 13, preferably to about pH 2 to about pH 11, and more preferably to about pH 3 to about 9; and about 20 wt % to about 99.8 wt % of the solvent, preferably about 40 wt % to about 99.7 wt %.

A passivator preferably comprises, based on the total weight of the passivator, about 0 wt % to about 2 wt % of the antifoam agent, preferably about 0.002 wt % to about 1 wt %, and more preferably about 0.003 wt % to about 0.5 wt %; about 0.001 wt % to about 10 wt % of the corrosion inhibitor, preferably about 0.002 wt % to about 6 wt %, and more preferably about 0.003 wt % to about 5 wt %; a sufficient amount of the buffering and pH adjusting agent to adjust the pH to about pH 6 to about pH 13, preferably to about pH 7 to about pH 12.5, and more preferably about pH 7.5 to about pH 11.5; and about 80 wt % to about 99.5 wt % of the solvent, preferably about 90 wt % to about 99 wt %.

In one embodiment, the corrosion inhibitor of the cleaner-passivator composition comprises a silicate, a tetraalkylorthosilicate ester, an organosilane-based compound comprising a silicon-carbon bond, or a combination comprising one or more of the foregoing compounds; an azole compound; and a pyrophosphate compound. The silicate and/or tetraalkylorthosilicate ester, when present, comprises about 0.005 wt % to about 1 wt %, preferably about 0.01 wt % to about 0.7 wt %, and more preferably about 0.02 wt % to about 0.5 wt % of the total weight of the cleaner and/or passivator composition. The organosilane-based compound comprising a silicon-carbon bond, when present, comprises about 0.001 wt % to about 1 wt %, preferably about 0.005 wt % to about 0.5 wt %, and more preferably about 0.01 wt % to about 0.2 wt % of the total weight of the cleaner and/or passivator composition. The azole compound comprises about 0.0002 wt % to about 2 wt %, preferably about 0.001% wt to about 1 wt %, and more preferably about 0.002 wt % to about 0.6 wt % of the total weight of the cleaner and/or passivator composition. The pyrophosphate comprises about 0.001 wt % to about 1 wt %, preferably about 0.002 wt % to about 0.8 wt %, and more preferably about 0.0025 wt % to about 0.5 wt % of the total weight of the cleaner and/or passivator composition.

If the cleaner-passivator composition is in the form of a single package cleaner-passivator composition, the pH of the composition may be about pH 4 to about pH 13, or about pH 7 to about pH 12.5. If the cleaner and passivator compositions are separated into two packages, the pH of the cleaner may be about pH 1 to about pH 13, or about pH 3 to about pH 11. The passivator composition may have a pH of about pH 6 to about pH 13, or about pH 7 to about pH 12.5. If the cleaner composition pH is lower than about 7, one or more oxygen scavenger and ferric ion reducers, such as erythorbate, sulfite, bisulfite, etc., may be added to minimize corrosion during the cleaning period.

A method of cleaning and passivating a fuel cell system comprises contacting the fuel cell system with the above-described cleaner-passivator composition, either in one part or two parts. After contacting with the cleaner-passivator composition, the fuel cell system is preferably rinsed with a rinse solvent such as water, methanol, ethanol, propanol, butanol, furfurol, ethylene glycol, diethylene glycol, triethylene glycol, 1,2-propylene glycol, 1,3-propylene glycol, dipropylene glycol, butylene glycol, glycerol, monoethylether of glycerol, dimethyl ether of glycerol, 1,2,6-hexanetriol, trimethylolpropane, methoxyethanol, or a combination comprising one or more of the foregoing solvents. The contacting and rinsing are preferably done in a manner sufficient to maintain conductivity of a coolant subsequently contacted with the fuel cell system below about 5 microseamens/cm after about 1 hour of exposure in the coolant. The coolant for this test comprises about 10 wt % to about 100 wt % of water and about 10 wt % to about 90 wt % of an alcohol. The alcohol comprises, for example, methanol, ethanol, propanol, butanol, furfurol, ethylene glycol, diethylene glycol, triethylene glycol, 1,2-propylene glycol, 1,3-propylene glycol, dipropylene glycol, butylene glycol, glycerol, monoethylether of glycerol, dimethyl ether of glycerol, 1,2,6-hexanetriol, trimethylolpropane, methoxyethanol, and combinations comprising one or more of the foregoing alcohols. The coolant for this test should comprise no additives that would serve to appreciably alter the conductivity of the coolant.

The cleaner-passivator may be employed in the treatment of fuel cell systems such as, for example, PEMFC (proton exchange membrane or polymer electrolyte membrane fuel cells), PAFC (phosphoric acid fuel cells), MCFC (molten carbonate fuel cells), SOFC (solid oxide fuel cells), and AFC (alkaline fuel cells).

The invention is further illustrated by the following non-limiting examples.

EXAMPLE 1

Cleaner-Passivator Composition

TABLE 1

Composition of cleaner-passivator for Example 1

| Component | Function | Weight % |
| --- | --- | --- |
| DI Water | Solvent | 88.843% |
| Citric acid | Complexing agent | 4.625% |
| NaOH, 50% | pH adjusting agent | 5.842% |
| Silquest ® Y-5560 Silane | Corrosion inhibitor | 0.08% |
| Sodium Silicate | Corrosion inhibitor | 0.21% |
| Potassium Pyrophosphate | Complexing agent and corrosion inhibitor | 0.05% |
| Sodium Tolytriazole | Corrosion inhibitor | 0.05% |
| Sodium Nitrate | Corrosion inhibitor | 0.2% |
| Pluronic L-61 | Surfactant and antifoam agent | 0.1% |
| Total | | 100% |

In this example, the concentrated cleaner-passivator was diluted 10-fold (270 ml deionized (DI) water+30 ml cleaner-passivator). The samples used to mimic the components typically employed in fuel cell coolant systems were two cast aluminum coupons, two brass coupons, two stainless steel (SS316) coupons, one brazed aluminum coupon, one silicone gasket, and two Viton O-rings. The total surface area of the samples was 194 square centimeters and the samples were electrically connected to each other. Teflon blocks were placed in the bottom of a glass jar and the metal coupons were placed on top of the Teflon blocks in the jar. The cleaner-passivator solution was added to the glass jar and heated for 20 minutes after the solution reached 80° C. To remove the cleaner-passivator solution, the glass jar with the samples was then rinsed with DI water 2 times using 300 ml DI water, and the rinse solution was discarded. 300 ml DI water was then added into the jar and the conductivity of the solution was recorded as a function of time. As a comparison, a blank test was carried out by recording the conductivity of the solution by using the identical samples immersed in 300 ml DI water with no cleaner-passivator treatment. The results obtained are given below.

TABLE 2

Conductivity data for cleaner-passivator of Example 1

| Time | Blank Test Conductivity (µS/cm) | Example 1 cleaner-passivator treated Conductivity (µS/cm) |
| --- | --- | --- |
| 0 min | 1.80 | 0.36 |
| 20 min | 10.12 | 0.77 |
| 60 min | 16.65 | 1.17 |
| 120 min | 21.20 | 1.55 |
| 18 hours | 38.00 | 3.21 |

As can be seen from Table 2, the blank test samples show a significant increase in conductivity of the water exposed to the samples from 1.8 µS/cm at zero minutes to 38 µS/cm at 18 hours. The water exposed to the samples treated with the cleaner-passivator exhibits an initial conductivity of only 0.36 µS/cm, increasing to 3.21 µS/cm after 18 hours. Thus, in this example, the cleaner-passivator treatment reduced the development of conductivity in the water exposed to the samples.

EXAMPLE 2

Alternate Cleaner-Passivator System

TABLE 3

Cleaner-Passivator Composition

| Component | Function | Weight % |
| --- | --- | --- |
| DI Water | Solvent | 88.743% |
| Citric acid | Complexing agent | 4.625% |
| NaOH, 50% | pH adjusting agent | 5.842% |
| Silquest ® Y-5560 Silane | Corrosion inhibitor | 0.08% |
| Sodium silicate | Corrosion inhibitor | 0.21% |
| Potassium Pyrophosphate | Complexing agent and corrosion inhibitor | 0.05% |
| Sodium Tolytriazole | Corrosion inhibitor | 0.05% |
| Sodium Nitrate | Corrosion inhibitor | 0.2% |
| Pluronic L-61 | Surfactant and antifoam agent | 0.2% |
| Total | | 100% |

The cleaner-passivator treatment of Example 2 was identical to that of Example 1, except that the amount of surfactant/antifoam was doubled. The samples used included one cast aluminum coupon, one brass pipe section, one stainless steel (SS316) coupon, one brazed aluminum coupon, one silicone gasket, and two Viton O-rings. The total surface area of the samples was 120 square centimeters. The samples were electrically connected to each other. Two sets of samples were put into separate glass jars with 300 ml tap water. The samples were pre-corroded in the tap water for five days after which they were rinsed with DI water and dried with a paper towel. The samples were then placed in a clean glass jar.

The concentrated cleaner-passivator was diluted 10-fold (270 ml DI water+30 ml cleaner-passivator). The cleaner-passivator solution was added to the glass jar and heated for 20 minutes after the solution reaches 80° C. To remove the cleaner-passivator solution, the glass jar with the samples was then rinsed with DI water 2 times using 300 ml DI water, and the rinse solution was discarded. 300 ml DI water was then added into the jar and the conductivity of the solution was recorded as a function of time. As a comparison, a blank test was carried out by recording the conductivity of the solution by using the identical samples immersed in 300 ml DI water with no cleaner-passivator treatment. The results obtained are given below.

TABLE 4

Conductivity data for cleaner-passivator of Example 2

| Time | Blank Test Conductivity ($\mu$S/cm) | Example 1 cleaner-passivator treated Conductivity ($\mu$S/cm) |
|---|---|---|
| 0 min | 1.80 | 0.34 |
| 20 min | 2.64 | 1.50 |
| 120 min | 5.56 | 3.62 |
| 22 hours | 22.1 | 6.88 |

As can be seen from Table 4, the blank test samples show a significant increase in conductivity of the water exposed to the samples from 1.8 $\mu$S/cm at zero minutes to 22.1 $\mu$S/cm at 22 hours. The water exposed to the samples treated with the cleaner-passivator exhibits an initial conductivity of only 0.34 $\mu$S/cm, increasing 6.88 $\mu$S/cm after 22 hours. Thus, in this example, the cleaner-passivator treatment reduced the development of conductivity in the water exposed to the samples.

EXAMPLE 3

Alternative Cleaner-Passivator

TABLE 5

Cleaner-Passivator Composition

| Component | Function | Weight % |
|---|---|---|
| DI Water | Solvent | 88.773% |
| Citric acid | Complexing agent | 4.624% |
| NaOH, 50% | pH adjusting agent | 5.813% |
| PPG-2000 (polypropylene glycol) | Antifoam | 0.002% |
| Sodium silicate | Corrosion inhibitor | 0.07% |
| n-propanol | Solvent | 0.018% |
| Potassium Pyrophosphate | Complexing agent and corrosion inhibitor | 0.05% |
| Sodium Tolytriazole | Corrosion inhibitor | 0.05% |
| Tomadol 25-12 (ethoxylated alcohol) | Surfactant | 0.6% |
| Total | | 100% |

A test procedure similar to the one used in Example 1 was used. One difference was that the cleaning-passivating step was carried out at a room temperature, e.g., at about 22° C. in these tests. The test samples were identical (in terms of quantity and kind) to the ones used in Example 2.

TABLE 6

Results for the cleaner-passivator of Example 3

| Time | Rinse No. - Blank | Rinse No. - Test | Blank Conductivity | Test Conductivity | Temperature |
|---|---|---|---|---|---|
| 0 min | 0 | 0 | 9.31 $\mu$S/cm | 11.08 mS/c | 21.5° C. |
| 20 min | 0 | 0 | 13.46 $\mu$S/cm | 11.16 mS/cm | 20.7° C. |
| 40 min | 0 | 0 | 14.53 $\mu$S/cm | 10.95 mS/cm | 22.7° C. |
| 60 min | 0 | 0 | 18.86 $\mu$S/cm | 10.83 $\mu$S/cm | 23.3° C. |
| 0 min | 1 | 1 | 2.33 $\mu$S/cm | 158.6 $\mu$S/cm | 21.2° C. |
| 0 min | 2 | 2 | 0.85 $\mu$S/cm | 7.61 $\mu$S/cm | 21.6° C. |
| 0 min | 3 | 3 | 0.60 $\mu$S/cm | 2.83 $\mu$S/cm | 22.0° C. |
| 0 min | 4 | 4 | 0.72 $\mu$S/cm | 2.75 $\mu$S/cm | 22.5° C. |
| 0 min | 5 | 5 | 0.67 $\mu$S/cm | 1.47 $\mu$S/cm | 21.6° C. |
| 20 min | 5 | 5 | 2.54 $\mu$S/cm | 5.86 $\mu$S/cm | 22.0° C. |
| 40 min | 5 | 5 | 3.52 $\mu$S/cm | 7.06 $\mu$S/cm | 22.1° C. |
| 60 min | 5 | 5 | 4.52 $\mu$S/cm | 8.44 $\mu$S/cm | 22.5° C. |
| 80 min | 5 | 5 | 5.45 $\mu$S/cm | 8.97 $\mu$S/cm | 22.4° C. |
| 100 min | 5 | 5 | 6.33 $\mu$S/cm | 9.67 $\mu$S/cm | 21.9° C. |
| 20 hours | 5 | 5 | 26.8 $\mu$S/cm | 27.6 $\mu$S/cm | 22.8° C. |

The results show that more rinse steps were required when the Example 3 formulations were used due to foaming conditions. After exposure to the cleaning-passivation treatment in Example 3, 3 DI water rinses were employed to reduce the solution conductivity containing the test specimens to 1.47 $\mu$S/cm.

EXAMPLE 4

Alternative Cleaner-Passivator Treatment

TABLE 7

Cleaner-Passivator Composition

| Component | Function | Weight % |
|---|---|---|
| DI Water | Solvent | 88.953% |
| Citric acid | Complexing agent | 4.625% |
| NaOH, 50% | pH adjusting agent | 5.842% |
| PPG-2000 | Antifoam | 0.002% |
| Sodium silicate | Corrosion inhibitor | 0.21% |
| Isopropanol | Solvent | 0.018% |
| Potassium Pyrophosphate | Complexing agent and corrosion inhibitor | 0.1% |
| Sodium Tolytriazole | Corrosion inhibitor | 0.05% |
| Tomadol 25-12 | Surfactant | 0.2% |
| Total | | 100% |

A test procedure similar to the one used in Example 1 was used. One difference was that the cleaning-passivating step was carried out at a room temperature, e.g., at about 22° C. in these tests. The test samples were identical (in terms of quantity and kind) to the ones used in Example 2.

TABLE 8

Results for the cleaner-passivator of Example 4

| Time | Rinse No. - Blank | Rinse No. - Test | Blank Conductivity | Test Conductivity | Temperature |
|---|---|---|---|---|---|
| 0 min | 0 | 0 | | Not Determined | N.D. |
| 60 min | 0 | 0 | | 11.63 mS/cm | 21.5° C. |
| 0 min | 1 | 1 | | 196 $\mu$S/cm | 21.9° C. |
| 0 min | 2 | 2 | | 12.18 $\mu$S/cm | 21.8° C. |
| 0 min | 3 | 3 | | 2.32 $\mu$S/cm | 21.9° C. |

TABLE 8-continued

Results for the cleaner-passivator of Example 4

| Time | Rinse No. - Blank | Rinse No. - Test | Blank Conductivity | Test Conductivity | Temperature |
|---|---|---|---|---|---|
| 0 min | 4 | 4 |  | 1.97 µS/cm | 21.7° C. |
| 0 min | 5 | 5 | 3.27 µS/cm | 1.62 µS/cm | 21.6° C. |
| 20 min | 5 | 5 | 12.35 µS/cm | 10.35 µS/cm | 22.4° C. |
| 40 min | 5 | 5 | 18.36 µS/cm | 13.63 µS/cm | 21.9° C. |
| 60 min | 5 | 5 | 21.2 µS/cm | 15.12 µS/cm | 22.2° C. |
| 80 min | 5 | 5 | 23.4 µS/cm | 16.20 µS/cm | 22.0° C. |
| 100 min | 5 | 5 | 25.0 µS/cm | 17.07 µS/cm | 21.9° C. |
| 120 min | 5 | 5 | 26.5 µS/cm | 17.95 µS/cm | 21.6° C. |
| 20 hours | 5 | 5 | 52.4 µS/cm | 32.1 µS/cm | 21.6° C. |
| 0 min | 6 | 6 | 2.29 µS/cm | 1.36 µS/cm | 21.3° C. |
| 30 min | 6 | 6 | 3.98 µS/cm | 2.88 µS/cm | 21.7° C. |
| 60 min | 6 | 6 | 4.60 µS/cm | 3.36 µS/cm | 21.7° C. |

The results show that more rinse steps were required for the Example 4 formulations due to foaming conditions. After exposure to the cleaning-passivation treatment in Example 4, the conductivity after 5 DI water rinse was 1.62 µS/cm.

In summary, the test results in Examples 1 to 4 show that multiple rinses of the samples with DI water alone were not sufficient to maintain low conductivity due to generation of new ionic species from corrosion and possible incomplete removal of contamination from sample surfaces. Further, the surfactant used in the cleaner-passivator treatment influences the number of rinses required to remove the cleaning solution. Foaming generated during the cleaning process may be the cause of this problem. Finally, the passivation capability of the treatment depends on the treatment composition and the application temperature. Increasing treatment temperature (e.g., to 80° C.) and using a properly formulated treatment should enable one to obtain the suitable results, i.e., suitable cleaning, easy rinse removal of the used treatment, and the formation of a highly effective and durable protective passive films on the specimen surfaces.

COMPARATIVE EXAMPLE 5

Treatment With A Passivator Only

The benefits of enhanced corrosion protection for an aluminum surface by using the cleaner-passivator treatment are demonstrated in this example. Identical 3003 aluminum plate coupons with a surface area of 8.04 square centimeters were subjected to the same treatment in (1) a solution described in Example 1, with a cleaning-passivation temperature of 80° C. for 20 minutes; (2) a solution as in Example 1, but the temperature was 40° C.; (3) DI water only; (4) no treatment—blank; and (5) the passivator treatment solution described below at 80° C. for 20 minutes.

TABLE 9

Passivator Treatment

| Component | Function | Weight % |
|---|---|---|
| DI Water | Solvent | 1.9743% |
| Ethylene glycol | Solvent | 95.144% |
| Phosphoric acid, 75% | Corrosion Inhibitor/ pH adjusting agent | 0.6602% |
| Borax 5 mol | pH adjusting agent/ Corrosion Inhibitor | 0.3975% |
| NaOH, 50% | pH adjusting agent | 1.0948% |
| Silquest ® Y-5560 Silane | Corrosion inhibitor | 0.0775% |

TABLE 9-continued

Passivator Treatment

| Component | Function | Weight % |
|---|---|---|
| Sodium silicate | Corrosion inhibitor | 0.3847% |
| PPG-2000 | Antifoam | 0.0007% |
| Sodium Nitrate | Corrosion inhibitor | 0.2% |
| Isopropanol | Solvent | 0.0060% |
| Uranine dye | Colorant | 0.002% |
| Sodium Tolytriazole | Corrosion inhibitor | 0.0583% |
| Total |  | 100% |

After the treatment, the aluminum plate was rinsed with DI water and immersed in 50 wt % ethylene glycol+50% DI water+100 ppm chloride was Cl (from NaCl) solution saturated with air. After 30 minutes, electrochemical measurements including linear polarization and anodic polarization in the region from the corrosion potential (about −0.6V/AgAgCl to +1.0V/AgAgCl) were conducted. In FIG. 1, curve 1 is for the cleaner-passivator of Example 1 employed at 80° C., curve 2 is for the cleaner-passivator of Example 2 employed at 40° C., curve 3 is a blank with no cleaner-passivator treatment, curve 4 is for a deionized water treatment at 80° C., and curve 5 is for passivator treatment only as in Table 9 employed at 80° C. The anodic polarization curve results (FIG. 1) indicated that the Example 1 solution treated at 80° C. provided best overall corrosion protection. The anodic current was generally more than one order of magnitude lower that the blank, i.e., the one without treatment. In other words, the corrosion protection efficiency was greater than about 90%. The Example 1 solution treated at 40° C. provided the second best corrosion protection in terms of having a slightly higher passive film breakdown potential and a lower anodic current at potential region more anodic than 0.0V/AgAgCl. At a potential lower than the passive film breakdown at about 0V/AgAgCl, the passivator treatment only provided the best corrosion protection. Deionized water treatment provided very slight improved corrosion protection from blank.

EXAMPLE 6

Cleaner-Passivator Treatment

TABLE 10

Alternative cleaner-passivator composition

| Component | Function | Weight % |
|---|---|---|
| DI Water | Solvent | 91.293% |
| Bayhibit AM (or PBTC, 50%) | Complexing agent | 4.625% |
| NaOH, 50% | pH adjusting agent | 3.392% |
| Silquest ® Y5560 silane | Corrosion inhibitor | 0.08% |
| Sodium silicate | Corrosion Inhibitor | 0.21% |
| Potassium Pyrophosphate | Complexing agent and corrosion inhibitor | 0.05% |
| Sodium Nitrate | Corrosion inhibitor | 0.2% |
| Sodium Tolytriazole | Corrosion inhibitor | 0.05% |
| Pluronic L-61 | Surfactant | 0.1% |
| Total |  | 100% |

Note: A great deal of hydrogen evolution reaction occurred on the Al coupon during cleaning at 80° C., possibly indicating a high Al corrosion rate.

The surface area of the samples was +/−198 cm$^2$. The Blank Fluid was 300 ml DI H2 and the Test Fluid was 30 ml cleaner+270 ml DI H2O.

TABLE 11

Results for cleaner-passivator of example 6

| Time | Rinse Blank # | Rinse Test # | Conductivity Blank | Conductivity Test | Temperature |
|---|---|---|---|---|---|
| 0 minutes | | 0 | | — | 80.0° C. |
| 20 minutes | | 0 | | — | 80.0° C. |
| 0 minutes | | 1 | | 193.5 µS/cm | 25.6° C. |
| 0 minutes | | 2 | | 9.91 µS/cm | 23.7° C. |
| 0 minutes | 0 | 3 | 2.31 µS/cm | 0.61 µS/cm | 23.1° C. |
| 20 minutes | 0 | 3 | 11.05 µS/cm | 2.71 µS/cm | 22.5° C. |
| 40 minutes | 0 | 3 | 16.67 µS/cm | 3.86 µS/cm | 22.9° C. |
| 60 minutes | 0 | 3 | 21.2 µS/cm | 5.53 µS/cm | 22.7° C. |
| 80 minutes | 0 | 3 | 24.5 µS/cm | 7.41 µS/cm | 22.2° C. |
| 100 minutes | 0 | 3 | 26.5 µS/cm | 8.93 µS/cm | 22.3° C. |
| 120 minutes | 0 | 3 | 28.0 µS/cm | 10.65 µS/cm | 22.3° C. |

As shown in Table 11, even out to 120 minutes after treatment, the cleaner passivator gives a greater than 2-fold improvement in conductivity compared to a water blank.

The disclosed cleaner-passivator compositions lead to a reduction in conductivity of water exposed to model systems compared to simple water washing. It is expected that treatment with the cleaner-passivator will reduce the conductivity of circulating coolant in a fuel cell coolant system. As shown in the examples, use of a cleaner and a passivator leads to a reduction in circulating contaminants as well as a reduction in surface corrosion. Thus, by employing the disclosed cleaner-passivator, the conductivity of the circulating coolant in a fuel cell coolant system may be kept within acceptable limits.

All ranges disclosed herein are inclusive and combinable. While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of treating a fuel cell coolant system comprising:
   contacting the fuel cell coolant system with a cleaner-passivator composition, and
   rinsing the fuel cell coolant system with a rinse solvent; wherein the cleaner-passivator composition comprises a complexing agent, a surfactant, a corrosion inhibitor, and a solvent.

2. The method of claim 1, wherein the rinse solvent is water, methanol, ethanol, propanol, butanol, furfurol, ethylene glycol, diethylene glycol, triethylene glycol, 1,2-propylene glycol, 1,3-propylene glycol, dipropylene glycol, butylene glycol, glycerol, monoethylether of glycerol, dimethyl ether of glycerol, 1,2,6-hexanetriol, trimethylolpropane, methoxyethanol, or a combination comprising one or more of the foregoing solvents.

3. The method of claim 1, wherein the complexing agent comprises no added non-biodegradable aminocarboxylates.

4. The method of claim 1, wherein the complexing agent comprises no added aminocarboxylates.

5. The method of claim 1, wherein the complexing agent is a hydroxycarboxylate; a phosphonate; a phosphinate; a carboxylate; a dicarboxylate; an acrylate-based polymer, copolymer, or terpolymer; a polyaspartic acid; an aspartic acid copolymer; or a combination comprising one or more of the foregoing complexing agents.

6. The method of claim 1, wherein the complexing agent is citric acid, tartaric acid, gluconic acid, glucaric acid, glucoheptonic acid, glycolic acid, HEDP (1-1-hydroxyethylidene-1, 1-diphosphonic acid), PBTC (2-phosphono-butane-1,2,4-tricarboxylic acid), AMP (amino tri(methylene phosphonic acid)), HPA (hydroxyphosphono acetic acid), HMDTMP (hexamethylenediaminetetra (methylene phosphonic acid)), DTPA diethylenetriaminepenta (methylenephosphonic acid), phosphono succinic acid or its mono, bis and oligomeric adducts, phosphino succinic acid or its mono, bis and oligomeric adducts, oxalic acid, benzoic acid, formic acid, acetic acid, sulfamic acid, adipic acid, succinic acid, peracetic acid; a polyacrylate, an acrylate-acrylamide copolymer, an acrylate-AMPS (acrylamido methylene sulphonic acid) copolymer, an acrylate-maleate copolymer, an acrylate-hydroxypropolyacrylate copolymer, an acrylate-sulfonic acid copolymer, an acrylate-acrylamide-sulfonic acid terpolymer, a polymaleic acid, a polymaleic anhydride, a polymethylacrylic acid, an acrylate-methacrylate copolymer, a styrene sulphonate-maleic acid copolymer, a phosphinate-acrylate copolymer, an acrylate-AMPS-styrene sulphonate terpolymer, an acrylate-AMPS-phosphinate terpolymer, a polyaspartic acid, an aspartic acid based copolymer, an isomer or salt of any of the foregoing complexing agents, or a combination comprising one or more of the foregoing complexing agents.

7. The method of claim 1, wherein the corrosion inhibitor is a silicate; a tetraalkylorthosilicate ester with the alkyl groups containing 1 to 20 carbon atoms; an organosilane-based compound comprising a silicon-carbon bond; a carboxylate; a $C_5$–$C_{16}$ dicarboxylates; a $C_5$–$C_{16}$ monocarboxylic acid; a neoacid; an alkyl($C_1$–$C_{14}$)cyclohexenoic acid or its salts; a nitrate salt; a nitrite salt; a phosphate salt; an azole; a hydrocarbyl triazole; a thiazole; an imidazole; an orthophosphate; a pyrophosphate; a hexametaphosphate; a polyphosphate; a phosphonate, a phosphinate; a molybdate; a vanadate; a tungstate; a borate; a silicate; a zinc compound; or a combination comprising one or more of the foregoing corrosion inhibitors.

8. The method of claim 1, wherein the surfactant is an ethylene oxide-propylene block copolymer, an alkoxylated alcohol, a nonylphenyl ethoxylate, an octaphenyl ethoxylate, a primary ethoxylated alcohol, a secondary ethoxylated alcohol, a polyethylene fatty acid, a polypropylene oxide, a polypropylene glycol, sodium dioctyl sulfosuccinate, sodium dodecylbenzenesulphonate, sulphonated diphenyl oxide, an ethoxylated ether amine; an amphoteric surfactant, an amine or imidazole of a fatty acid, a sodium alkyl naphthalene sulphonate, a phosphate aromatic or aliphatic ester, a sodium xylene sulphonate, an alcohol surfactant, or a combination comprising one or more of the foregoing surfactants.

9. The method of claim 1, wherein the cleaner-passivator composition further comprises an antifoam agent, a pH adjusting agent, a biocide, a colorant, a dye, or a combination comprising one or more of the foregoing agents.

10. The method of claim 1, wherein the solvent is water, ethylene glycol, 1,2-propylene glycol, diethylene glycol, triethylene glycol, dipropylene glycol, 1,3-propanediol, butylene glycol, methanol, ethanol, propanol, isopropanol, butanol, furfurol, and glycerol, a monoethylether of glycerol, a dimethyl ether of glycerol, 1,2,6-hexanetriol, trimethylolpropane, methoxyethanol, or a combination comprising one or more of the foregoing solvents.

11. The method of claim 1, wherein the cleaner-passivator composition has a pH of about pH 4 to about pH 13.

12. The method of claim 1, wherein the cleaner-passivator composition is in the form of a two-part composition comprising a cleaner composition and a passivator composition, wherein the cleaner composition comprises the complexing agent, the surfactant, the corrosion inhibitor, and the solvent and has a pH of about pH 1 to about pH 13, and the passivator composition comprising the corrosion inhibitor and the solvent, and has a pH of about pH 6 to about pH 13.

13. The method of claim 1, further comprising contacting the fuel cell coolant system with a coolant after rinsing, wherein contacting with the cleaner-passivator composition is sufficient to maintain the coolant conductivity below about 5 microseamens/cm after about 1 hour of exposure of the fuel cell coolant system to the coolant, wherein the coolant comprises about 10 wt % to about 100 wt % of water and about 0 wt % to about 90 wt % of an alcohol.

14. The method of claim 6, wherein the complexing agent comprises citric acid.

15. The method of claim 7, wherein the corrosion inhibitor comprises a silicate, an organosilane-based compound comprising a silicon-carbon bond, a tetraalkylorthosilicate ester, or a combination thereof; an azole; and a pyrophosphate.

16. The method of claim 12, wherein contacting with the cleaner-passivator composition is performed at a temperature of about 10° C. to about 100° C.

17. The method of claim 13, wherein the alcohol is methanol, ethanol, propanol, butanol, furfurol, ethylene glycol, diethylene glycol, triethylene glycol, 1,2-propylene glycol, 1,3-propylene glycol, dipropylene glycol, butylene glycol, glycerol, monoethylether of glycerol, dimethyl ether of glycerol, 1,2,6-hexanetriol, trimethylpropane, methoxyethanol, or a combination comprising one or more of the foregoing alcohols.

18. The method of claim 16, wherein contacting with the cleaner-passivator composition is performed at a temperature of about 30° C. to about 100° C.

19. A method of treating a fuel cell coolant system comprising:
contacting the fuel cell coolant system with a cleaner-passivator composition, wherein the cleaner-passivator composition comprises a complexing agent, a surfactant, a corrosion inhibitor, and a solvent;
rinsing the fuel cell coolant system with a rinse solvent; and
contacting the fuel cell coolant system with a coolant after rinsing, wherein contacting with the cleaner-passivator composition is sufficient to maintain a coolant conductivity below about 5 microseamens/cm after about 1 hour of exposure of the fuel cell coolant system to the coolant, wherein the coolant comprises about 10 wt % to about 100 wt % of water and about 0 wt % to about 90 wt % of an alcohol.

20. The method of claim 19, wherein the complexing agent is a hydroxycarboxylate; a phosphonate; a phosphinate; a carboxylate; a dicarboxylate; an acrylate-based polymer, copolymer, or terpolymer; a polyaspartic acid; an aspartic acid copolymer; or a combination comprising one or more of the foregoing complexing agents.

21. The method of claim 19, wherein the corrosion inhibitor comprises a silicate, an organosilane-based compound comprising a silicon-carbon bond, a tetraalkylorthosilicate ester, or a combination thereof; an azole; and a pyrophosphate.

22. The method of claim 19, wherein the surfactant is an ethylene oxide-propylene block copolymer, an alkoxylated alcohol, a nonylphenyl ethoxylate, an octaphenyl ethoxylate, a primary ethoxylated alcohol, a secondary ethoxylated alcohol, a polyethylene fatty acid, a polypropylene oxide, a polypropylene glycol, sodium dioctyl sulfosuccinate, sodium dodecylbenzenesulphonate, sulphonated diphenyl oxide, an ethoxylated ether amine; an amphoteric surfactant, an amine or imidazoline of a fatty acid, a sodium alkyl naphthalene sulphonate, a phosphate aromatic or aliphatic ester, a sodium xylene sulphonate, an alcohol surfactant, or a combination comprising one or more of the foregoing surfactants.

23. A method of treating a fuel cell coolant system comprising:
contacting the fuel cell coolant system with a cleaner-passivator composition; and
rinsing the fuel cell coolant system with a rinse solvent;
wherein the cleaner-passivator composition is in the form of a two-part composition comprising a cleaner composition and a passivator composition, wherein the cleaner composition comprises a complexing agent, a surfactant, a corrosion inhibitor, and a solvent and has a pH of about pH 1 to about pH 13, and the passivator composition comprises the corrosion inhibitor and the solvent, and has a pH of about pH 6 to about pH 13.

24. The method of claim 23, wherein contacting with the cleaner-passivator composition is performed at a temperature of about 30° C. to about 100° C.

* * * * *